(12) United States Patent
Segawa et al.

(10) Patent No.: US 10,619,718 B2
(45) Date of Patent: Apr. 14, 2020

(54) WORM REDUCER AND METHOD OF ASSEMBLING WORM REDUCER

(71) Applicant: NSK LTD., Tokyo (JP)

(72) Inventors: Toru Segawa, Maebashi (JP); Toru Ishii, Maebashi (JP)

(73) Assignee: NSK LTD., Tokyo (JP)

( * ) Notice: Subject to any disclaimer, the term of this patent is extended or adjusted under 35 U.S.C. 154(b) by 422 days.

(21) Appl. No.: 15/508,176

(22) PCT Filed: Oct. 8, 2015

(86) PCT No.: PCT/JP2015/078681
§ 371 (c)(1),
(2) Date: Mar. 2, 2017

(87) PCT Pub. No.: WO2016/056633
PCT Pub. Date: Apr. 14, 2016

(65) Prior Publication Data
US 2017/0284532 A1 Oct. 5, 2017

(30) Foreign Application Priority Data

Oct. 9, 2014 (JP) ................................. 2014-207998
Feb. 25, 2015 (JP) ................................. 2015-035315
(Continued)

(51) Int. Cl.
*F16H 57/039* (2012.01)
*F16H 57/021* (2012.01)
(Continued)

(52) U.S. Cl.
CPC ............. *F16H 57/021* (2013.01); *F16H 1/16* (2013.01); *F16H 57/023* (2013.01); *B62D 5/0409* (2013.01); *F16H 2057/0213* (2013.01)

(58) Field of Classification Search
CPC ........ F16H 57/021; F16H 1/16; F16H 57/023; F16H 2057/0213; F16H 2057/0235;
(Continued)

(56) References Cited

U.S. PATENT DOCUMENTS

2004/0065163 A1 4/2004 Takahashi et al.
2006/0196295 A1 9/2006 Maeda et al.
(Continued)

FOREIGN PATENT DOCUMENTS

CN 2272509 Y 1/1998
CN 202228653 U 5/2012
(Continued)

OTHER PUBLICATIONS

English translation of JP2005313659 (Year: 2005).*
(Continued)

*Primary Examiner* — Jun S Yoo
(74) *Attorney, Agent, or Firm* — Sughrue Mion, PLLC

(57) ABSTRACT

There is provided a method of assembling a worm reducer, which includes causing a worm wheel to be rotatably supported in a wheel accommodation part, externally fitting a pair of bearings at tip-side and base-side positions of a worm, inserting the worm into a worm accommodation part from an opening side thereof at a state where the worm is offset outward in a radial direction of the worm wheel with respect to a center axis of the worm accommodation part, causing the bearing which is externally fitted to a leading side in an insertion direction of the worm to pass an outer diameter-side of a part of an outer peripheral edge of the worm wheel, which protrudes most into the worm accommodation part, causing the worm teeth to mesh with the worm wheel, and further inserting the worm to a predetermined position in the worm accommodation part.

4 Claims, 15 Drawing Sheets

(30) Foreign Application Priority Data

Apr. 24, 2015 (WO) .................. PCT/JP2015/062585
Sep. 1, 2015 (JP) .................. 2015-171648

(51) Int. Cl.
*F16H 57/023* (2012.01)
*F16H 1/16* (2006.01)
*B62D 5/04* (2006.01)

(58) Field of Classification Search
CPC ............. F16H 57/039; F16H 2025/209; B62D 5/0409; B62D 5/0454; F16D 2125/42
See application file for complete search history.

(56) References Cited

U.S. PATENT DOCUMENTS

| | | |
|---|---|---|
| 2009/0120712 A1 | 5/2009 | Kashimoto et al. |
| 2009/0255751 A1 | 10/2009 | Kondo et al. |

FOREIGN PATENT DOCUMENTS

| | | |
|---|---|---|
| CN | 202612495 U | 12/2012 |
| JP | 11-303948 A | 11/1999 |
| JP | 2003-113909 A | 4/2003 |
| JP | 2003-320944 A | 11/2003 |
| JP | 2005-313659 A | 11/2005 |
| JP | 2006-142400 A | 6/2006 |
| JP | 2007-270943 A | 10/2007 |
| JP | 2008-223828 A | 9/2008 |
| JP | 2010-95006 A | 4/2010 |
| JP | 2011-255810 A | 12/2011 |
| JP | 2012-117648 A | 6/2012 |
| WO | 2008/087749 A1 | 7/2008 |

OTHER PUBLICATIONS

English translation of JP2012117648 (Year: 2012).*
Communication dated May 7, 2018, issued by the European Patent Office in counterpart European Patent Application No. 15849190.2.
Communication dated Jul. 30, 2018, issued by the State Intellectual Property Office of P.R. China in counterpart Chinese Application No. 201580051471.8.
Int. Search Report dated Dec. 28, 2015 issued in Int. Application No. PCT/JP2015/078681 (PCT/ISA/210).
Written Opinion dated Dec. 28, 2015 issued in Int. Application No. PCT/JP2015/078681 (PCT/ISA/237).

* cited by examiner

WORM REDUCER AND METHOD OF ASSEMBLING WORM REDUCER

TECHNICAL FIELD

The present invention relates to a worm reducer to be incorporated into an electric power steering device, for example, and a method of assembling the same.

BACKGROUND ART

As shown in FIG. 14, a steering device for an automobile is configured to transmit rotation of a steering wheel 1 to an input shaft 3 of a steering gear unit 2, and to push and pull a pair of left and right tie rods 4, 4 by rotation of the input shaft 3, thereby applying a steering angle to front wheels. The steering wheel 1 is supported and fixed to a rear end portion of a steering shaft 5, and the steering shaft 5 is rotatably supported to a cylindrical steering column 6 with being axially inserted into the steering column 6. A front end portion of the steering shaft 5 is connected to a rear end portion of an intermediate shaft 8 via a universal joint 7, and a front end portion of the intermediate shaft 8 is connected to the input shaft 3 via another universal joint 9.

In the above-described steering device, there has been known an electric power steering device configured to reduce a force necessary to operate the steering wheel 1 by using an electric motor 10 as an auxiliary power source. The electric power steering device is incorporated with a reducer. As such reducer, there has been used a worm reducer having a large lead angle and reversibility with respect to a transmission direction of power. FIG. 15 shows a structure disclosed in Patent Document 1 as an example of the conventional structure of the worm reducer incorporated in the electric power steering device. A worm reducer 21 is provided within a reducer housing 11 fixed to an electric motor 10a and has a worm 14 having worm teeth 13 formed on an axially intermediate portion of a worm shaft 12 and a worm wheel 15 configured to mesh with the worm teeth 13. Both axial end portions of the worm 14 are rotatably supported in a worm accommodation part 17 of the housing 11 by a pair of rolling bearings 16a, 16b such as deep groove ball bearings. One end portion (a left end portion in FIG. 15) of the worm 14 is connected to an output shaft 18 of the electric motor 10a, so that the worm 14 can be rotated.

The worm wheel 15 is rotatably provided within a wheel accommodation part 19 of the housing 11, and a center of rotation axis thereof is arranged at a skew position with respect to the worm 14. The worm wheel 15 is made by fixing a tooth part 20 of a synthetic resin around a metallic wheel part 29 so as to save the manufacturing cost and the weight. The tooth part 20 is meshed with the worm teeth 13 without a gap (i.e. backlash is zero), so that a rotational force between the worm wheel 15 and the worm 14 can be transmitted without causing a time lag resulting from the backlash. The worm wheel 15 is externally fitted to a portion close to a front end of a steering shaft 5a. Thereby, it is possible to transmit the rotation driving force generated from the electric motor 10a to the steering shaft 5a via the worm reducer 21 having the worm 14 and the worth wheel 15.

The worm reducer 21 is assembled as follows, for example. First, an outer ring of the tip-side rolling bearing 16a (right, in FIG. 15) is internally fitted (internally fitted by interference fit) to a bearing holding part 22a provided at an inner end portion (a right end portion, in FIG. 15) of the worm accommodation part 17 of the housing 11 which is configured to accommodate therein the worm 14. Then, the worm wheel 15 is rotatably supported within the wheel accommodation part 19 of the housing 11. Then, the worm 14 is inserted into the worm accommodation part 17 through an opening of the worm accommodation part 17 at a state where the worm 14 is offset outward (upward, in FIG. 15) in a radial direction of the worm wheel 15 with respect to a center axis of the worm accommodation part 17 so that the worm teeth 13 do not interfere with the tooth part 20 of the worm wheel 15. At a stage where the worm 14 is inserted into the worm accommodation part 17 to some extent, the worm 14 is displaced inward (downward, in FIG. 15) in the radial direction of the worm wheel 15 to mesh the worm teeth 13 and the tooth part 20 of the worm wheel 15 each other. With the worm teeth 13 and the tooth part 20 being meshed with each other, the worm wheel 15 is rotated to further insert the worm 14 into the worm accommodation part 17, so that a tip portion of the worm 14 is press-fitted into an inner ring of the tip-side rolling bearing 16a. Then, the base-side rolling bearing 16b (left, in FIG. 15) is press-fitted between a bearing holding part 22b provided at an intermediate portion of the worm accommodation part 17 and an outer periphery of an intermediate portion (the base side portion than the worm teeth 13) of the worm 14 (an outer ring of the base-side rolling bearing 16b is internally fitted to the bearing holding part 22b by loose fit or interference fit, and an inner ring thereof is externally fitted to the outer periphery of the intermediate portion of the worm 14 by interference fit). Subsequently, a snap ring 24 is engaged with an engagement groove 23 provided on an inner periphery of the worm accommodation part 17, so that axial displacements of the base-side rolling bearing 16b and the worm 14 are restricted. Then, the output shaft 18 of the electric motor 10a is connected to a base end portion (a left end portion, in FIG. 15) of the worm 14, and the opening of the worm accommodation part 17 is closed by a motor case 25 having the electric motor 10a accommodated therein.

According to the above method of assembling the worm reducer, the worm 14 and the pair of rolling bearings 16a, 16b for rotatably supporting the worm 14 are separately mounted in the worm accommodation part 17 of the housing 11. Therefore, the assembling cost increases, and the manufacturing cost of the worm reducer 21 increases.

In Patent Document 2, a worm shaft having each ball bearing attached thereto is inserted into a worm shaft accommodation part of the housing having a preload applying member attached thereto, and after the insertion, each ball bearing is applied with preload by an elastic restoring force of an arm part of the preload applying member. In this case, since the worm shaft is inserted while the outer ring of the base-side ball bearing is brought into contact with the arm part of the preload applying member, the worm shaft is necessarily required to move in the axial direction. Therefore, the worm wheel needs to be assembled after the assembling of the worm shaft so as not to interfere with the tip-side ball bearing at the assembling of the worm shaft.

BACKGROUND ART DOCUMENT

Patent Document

Patent Document 1: JP-A-2006-142400
Patent Document 2: JP-A-2012-117648

SUMMARY OF THE INVENTION

Problem to be Solved

The present invention has been made in view of the above-described circumstances, and an object of the present invention is to provide a worm reducer and a method of assembling the same capable of saving assembling cost.

Means for Solving the Problem

In a method of assembling a worm reducer according to an embodiment of the present invention, the worm reducer includes a housing, a worm wheel and a worm.

The housing includes a wheel accommodation part, and a worm accommodation part provided in a skew position with respect to the wheel accommodation part and having a part continued to the wheel accommodation part.

The worm wheel is rotatably supported in the wheel accommodation part.

The worm includes worm teeth provided on an axially intermediate portion of a worm shaft and rotatably supported in the worm accommodation part at two axial positions with the worm teeth being interposed therebetween by a pair of bearings at a state where the worm teeth are meshed with the worm wheel.

The method of assembling the worm reducer according to an embodiment of the present invention includes causing the worm wheel to be rotatably supported in the wheel accommodation part, externally fitting the pair of bearings at the two axial positions which interpose the worm teeth therebetween, and inserting the worm into the worm accommodation part from an opening side of the worm accommodation part at a state where the worm is offset outward in a radial direction of the worm wheel so that the worm teeth and the worm wheel do not interfere with each other.

The method further includes causing one of the pair of bearings which is externally fitted to a leading side in the insertion direction of the worm to pass an outer diameter-side of a part of an outer peripheral edge (tooth tip circle) of eth worm wheel, which protrudes most into the worm accommodation part. Then, the method further includes displacing the worm inward in the radial direction of the worm wheel such that the worm teeth mesh with the worm wheel, and further inserting the worm to a predetermined position in the worm accommodation part while the worm teeth and the worm wheel are meshed with each other, so that the worm is rotatably supported in the worm accommodation part by the pair of bearings.

When implementing the assembling method, an outer diameter of the bearing provided at the leading side in the insertion direction of the worm is made smaller than a distance in the radial direction of the worm between the inner surface of the worm accommodation part and a part of the outer peripheral edge (tooth tip circle) of the worm wheel, which protrudes most into the worm accommodation part. In this case, the outer diameter of the bearing externally fitted to the leading side in the insertion direction of the worm may be made smaller than a tooth tip circle diameter of the worm teeth. The outer diameter of the bearing externally fitted to the leading side in the insertion direction of the worm may be made greater than a tooth bottom circle diameter of the worm teeth.

In the assembling method, each of the pair of bearings may be a rolling bearing which includes a plurality of rolling elements provided between an outer ring and an inner ring, and a pair of bearing holding parts for holding the outer rings of the pair of rolling bearings may be provided on the inner periphery of the worm accommodation part at two positions in a worm axial direction. After the outer ring of one of the pair of rolling bearings starts to internally fit to one of the pair of bearing holding parts, the outer ring of the other of the pair of rolling bearings may be internally fit to the other of the pair of bearing holding parts.

In the assembling method, no backlash may be provided between the worm teeth and the worm wheel. In this case, a preload applying mechanism for elastically pressing the worm teeth toward the worm wheel may not be provided.

The one of the bearing holding parts, which is provided at an inner end portion of the worm accommodation part, may include an inner periphery having a diameter which is smaller than the inner periphery of the worm accommodation part, the worm accommodation part may include a guide portion having a diameter decreasing from the inner periphery of the worm accommodation part toward the one of the bearing holding parts, and the worm may be displaced inward in the radial direction of the worm wheel while the one of the bearings which is externally fitted to the leading side in the insertion direction of the worm contacting the guide portion such that the worm teeth mesh with the worm wheel.

In a worm reducer according to another embodiment of the present invention, each of the pair of bearings is a rolling bearing which includes a plurality of rolling elements provided between an outer ring and an inner ring, and the worm is rotatably supported by the pair of rolling bearings at the pair of bearing holding parts provided on the inner periphery of the worm accommodation part at two positions in a worm axial direction. One of the bearing holding parts which is provided at an inner end portion of the worm accommodation part has a bottomed cylindrical shape, and the outer ring of one of the rolling bearings which has the inner ring externally fitted to a tip portion of the worm is directly internally fitted (press-fitted) to the one of the bearing holding parts without interposing another member. An outer diameter of the outer ring of the one of the rolling bearings is made smaller than a distance in the radial direction of the worm between the inner surface of the worm accommodation part and a part of an outer peripheral edge (tooth tip circle) of the worm wheel, which protrudes most into the worm accommodation part In this case, an outer diameter of the one of the rolling bearings may be made smaller than the tooth tip circle diameter of the worm teeth.

The outer diameter of the one of the rolling bearings may be made greater than a tooth bottom circle diameter of the worm teeth.

An inner periphery upper portion of the worm accommodation part may be formed with a relief concave portion recessed radially outward, the relief concave portion may have an arc shape having a first radius, and the first radius may be equal to or greater than a second radius which is an external radius of the worm.

The one of the bearing holding parts, which is provided at the inner end portion of the worm accommodation part, includes an inner periphery having a diameter which is smaller than the inner periphery of the worm accommodation part, and the worm accommodation part may have a guide portion having a diameter decreasing from the inner periphery of the worm accommodation part toward the one of the bearing holding parts.

When an inner diameter of the other of the bearing holding parts at an opening side of the worm accommodation part is denoted as $d_{22d}$, an outer diameter of the outer ring of the one of the rolling bearings at the leading side in the insertion direction of the worm is denoted as $D_{16c}$, an outer diameter of the worm wheel is denoted as $D_{15}$, and a distance between a center axis of the worm wheel and a center axis of the worm accommodation part is denoted as L, a following Equation (1) is satisfied.

[Equation 1]

$$\frac{d_{22d}}{2} + L - \left(\frac{D_{15}}{2} + D_{16c}\right) \geq 0 \quad (1)$$

Effects of the Invention

According to the assembling method of assembling the worm reducer, since it is possible to integrally mount the worm and the pair of bearings for rotatably supporting the worm within the worm accommodation part of the housing, it is possible to suppress the assembling cost and to save the manufacturing cost of the worm reducer.

The worm is inserted into the worm accommodation part at the state where the worm is offset outward in the radial direction of the worm wheel such that the worm teeth and the worm wheel do not interfere with each other, the one of the bearings provided at the leading side in the insertion direction of the worm is caused to pass the outer diameter-side of the part of the worm wheel which protrudes most into the worm accommodation part, and then the worm teeth and the worm wheel are meshed with each other. Accordingly, when mounting the worm into the worm accommodation part, it is possible to suppress an axial displacement amount of the worm at the state where the worm teeth and the worm wheel are meshed with each other, as compared to a configuration where the worm teeth and the worm wheel are meshed with each other from start of the mounting operation without offsetting the worm (there is no space for offsetting the worm). As a result, even when a backlash is not provided between the worm teeth and the worm wheel, for example, the worm teeth and the worm wheel are less likely to be damaged such as scratches.

At a final stage of the mounting operation of mounting the worm into the worm accommodation part, it is possible to mount the worm into the worm accommodation part with being positioned in the radial direction.

Since the worm reducer is assembled in accordance with the assembling method as described above, it is possible to save the manufacturing cost.

DETAILED DESCRIPTION OF EMBODIMENTS

[First Embodiment]

Figure 15:
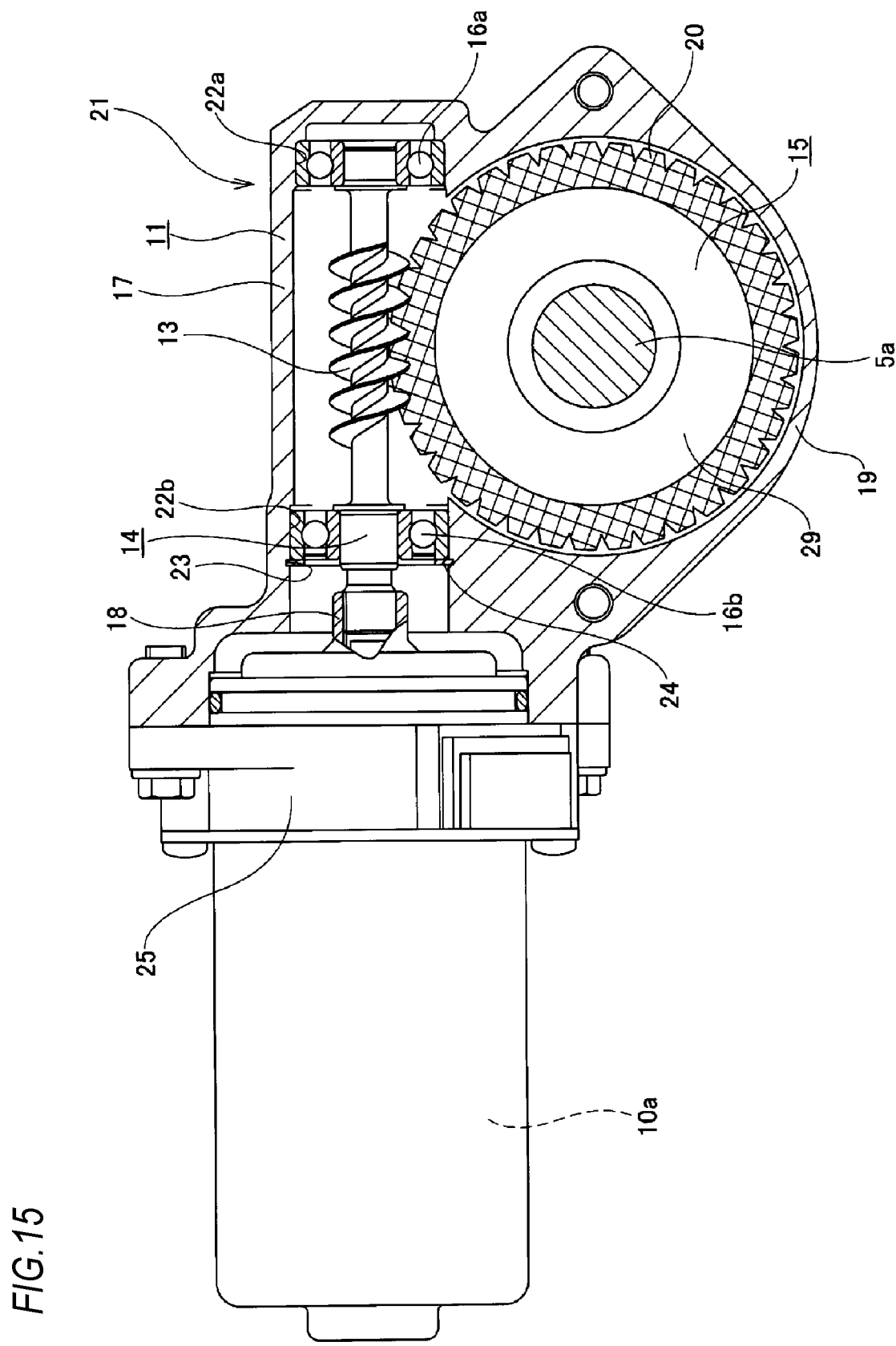
FIG. 15 is a sectional view showing a part of a power steering device to which a worm reducer incorporated.

FIGS. 1 to 6 show a first embodiment of the present invention. In the first embodiment, a worm and a pair of bearings for rotatably supporting the worm are integrally mounted in a worm accommodation part of a housing, so that the manufacturing cost can be saved. In a method of assembling a worm reducer of the first embodiment, a worm reducer 21a has basically the same configuration as the worm reducer 21 shown in FIG. 15, except for size relations of parts of the respective members configuring the worm reducer 21a.

That is, the worm reducer 21a of the first embodiment is provided within a reducer housing 11a fixed to an electric motor 10a and has a worm 14a having worm teeth 13 formed on an axially intermediate portion of a worm shaft 12, and a worm wheel 15 configured to mesh with the worm teeth 13. The housing 11a has a wheel accommodation part 19 configured to accommodate therein the worm wheel 15 and a worm accommodation part 17a having a part continued (opened) to the wheel accommodation part 19. A center axis of the wheel accommodation part 19 and a center axis of the worm accommodation part 17a are provided in skew positions with each other. The worm 14a is rotatably supported within the worm accommodation part 17a of the housing 11a at a tip portion (a right end portion, in FIGS. 1, 2 and 4 to 6) and a base side portion (a portion close to a left end, in FIGS. 1, 2 and 4 to 6) by a pair of rolling bearings 16c, 16d such as deep groove ball bearings. That is, an inner ring configuring the rolling bearing 16c of the pair of rolling bearings 16c, 16d, which is positioned at a tip side (a leading side in an insertion direction of the worm 14a into the worm accommodation part 17a when assembling the worm reducer 21a; a right side in FIGS. 1, 2 and 4 to 6), is externally fitted and fixed (externally fitted by interference fit) to the tip portion of the worm 14a, and an outer ring configuring the tip-side rolling bearing 16c is internally fitted to an inner bearing holding part 22c provided at an inner end portion (a right end portion, in FIGS. 1, 2 and 4 to 6) of the worm accommodation part 17a by loose fit. Incidentally, the outer ring configuring the tip-side rolling bearing 16c may be internally fitted to the inner bearing holding part 22c by interference fit. Also, an inner ring configuring the rolling bearing 16d of the pair of rolling bearings 16c, 16d, which is provided at a base side (a trailing side in the insertion direction of the worm 14a into the worm accommodation part 17a when assembling the worm reducer 21a; a left side in FIGS. 1, 2 and 4 to 6), is externally fitted and fixed to the base side portion of the worm 14a, and an outer ring configuring the base-side rolling bearing 16d is internally fitted to an opening side bearing holding part 22d provided at an opening of the worm accommodation part 17a by loose fit. By a snap ring or the like engaged to a portion axially adjacent to the portion of the opening side bearing holding part 22d to which the base-side rolling bearing is internally fitted, the outer ring configuring the base-side rolling bearing 16d is prevented from being separated from the opening side bearing holding part 22d Incidentally, the outer ring configuring the base-side rolling bearing 16d may be internally fitted to the opening side bearing holding part 22d by interference fit. An upper portion (a portion positioned at an opposite side to the worm wheel 15 in the radial direction of the worm accommodation part 17a) of an inner periphery of the worm accommodation part 17a is provided (formed) with a relief concave portion 28 recessed radially outward (upward, in FIGS. 1 to 6). The base end portion of the worm 14a is connected to an output shaft 18 of the electric motor 10a (refer to FIG. 15), so that the worm 14a can be rotated.

The worm wheel 15 is rotatably provided within the wheel accommodation part 19 of the housing 11a, and a center of rotation axis thereof is arranged at a skew position with respect to the worm 14a. The worm wheel 15 is made by fixing a tooth part 20 of a synthetic resin around a metallic wheel part 29. The tooth part 20 is meshed with the worm teeth 13 without a gap (i.e. a backlash is zero). Therefore, in the first embodiment, a preload applying mechanism for elastically pressing the worm teeth 13 toward the tooth part 20 is not provided. The worm wheel 15 is externally fitted and fixed to a front end side portion of the steering shaft 5a. Thereby, a rotation driving force generated from the electric motor 10a can be transmitted to the steering shaft 5a via the worm reducer 21a having the worm 14a and the worm wheel 15.

Figure 1:
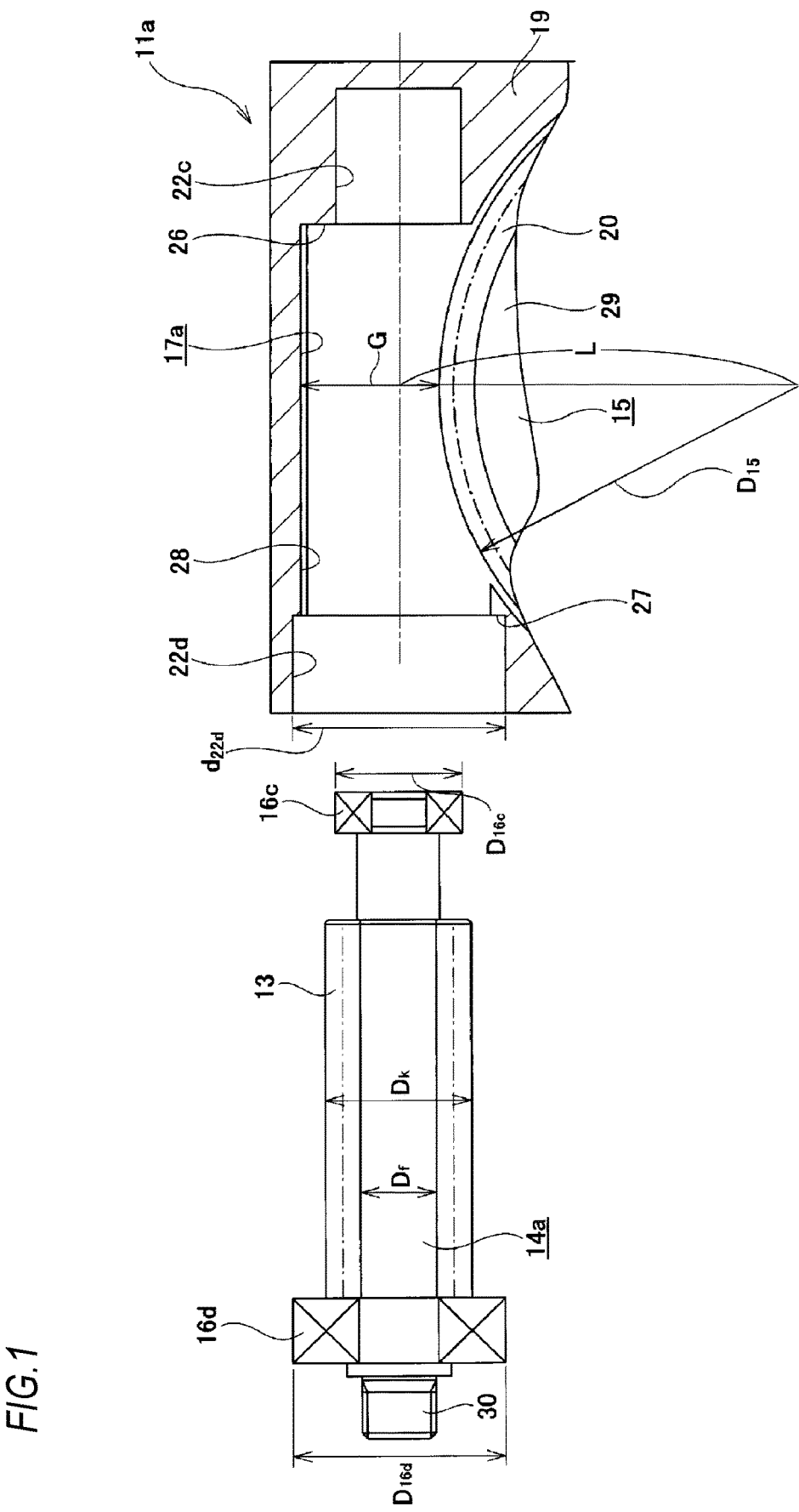
FIG. 1 is a sectional view showing a state before a worm is mounted to a housing according to a first embodiment of the present invention.
Figure 2:
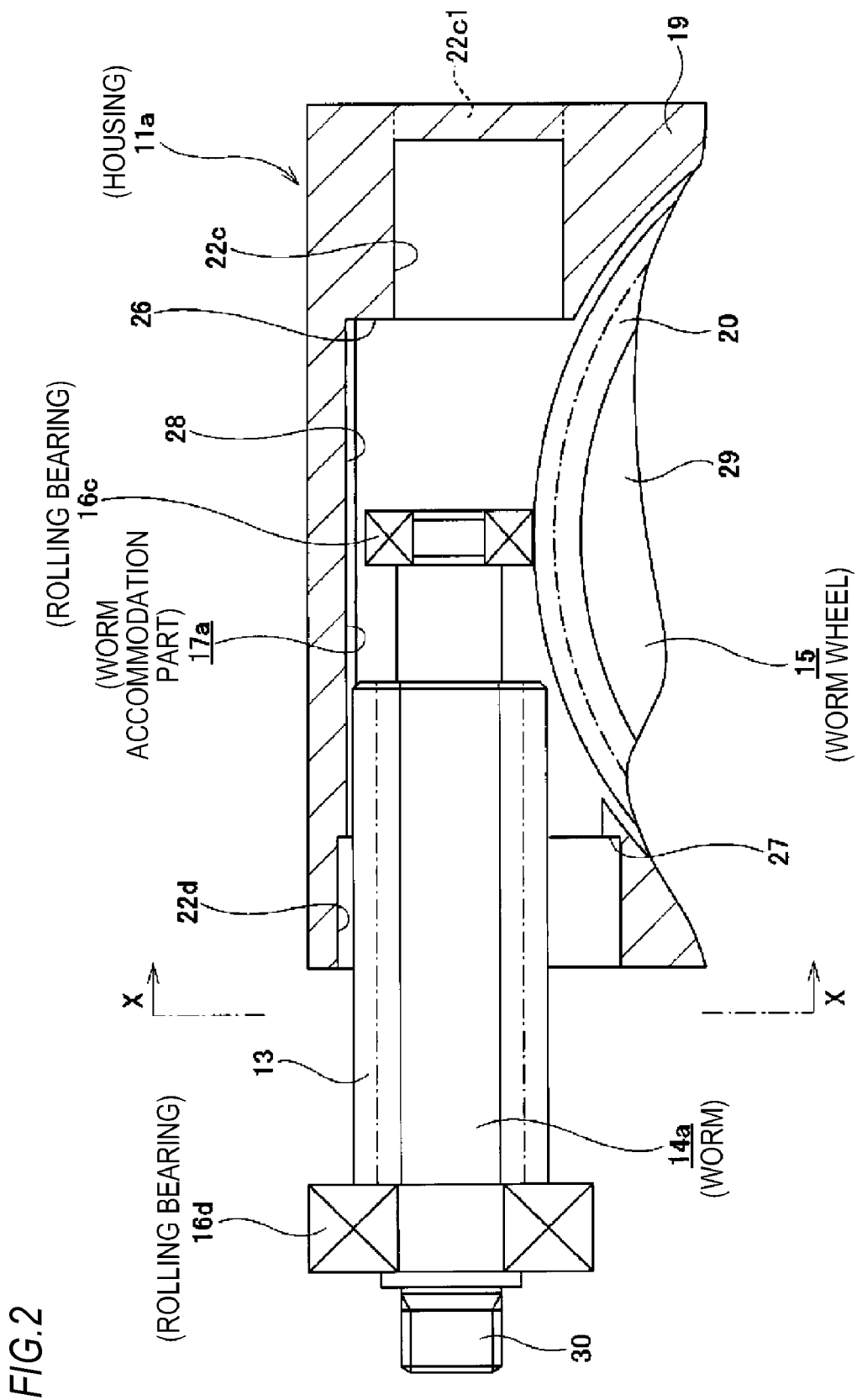
FIG. 2 is a sectional view showing a state where the worm is inserted in a worm accommodation part of the housing and a rolling bearing externally fitted at a tip portion of the worm is positioned at an outer diameter-side of an uppermost portion of a worm wheel according to the first embodiment of the present invention.
Figure 3:
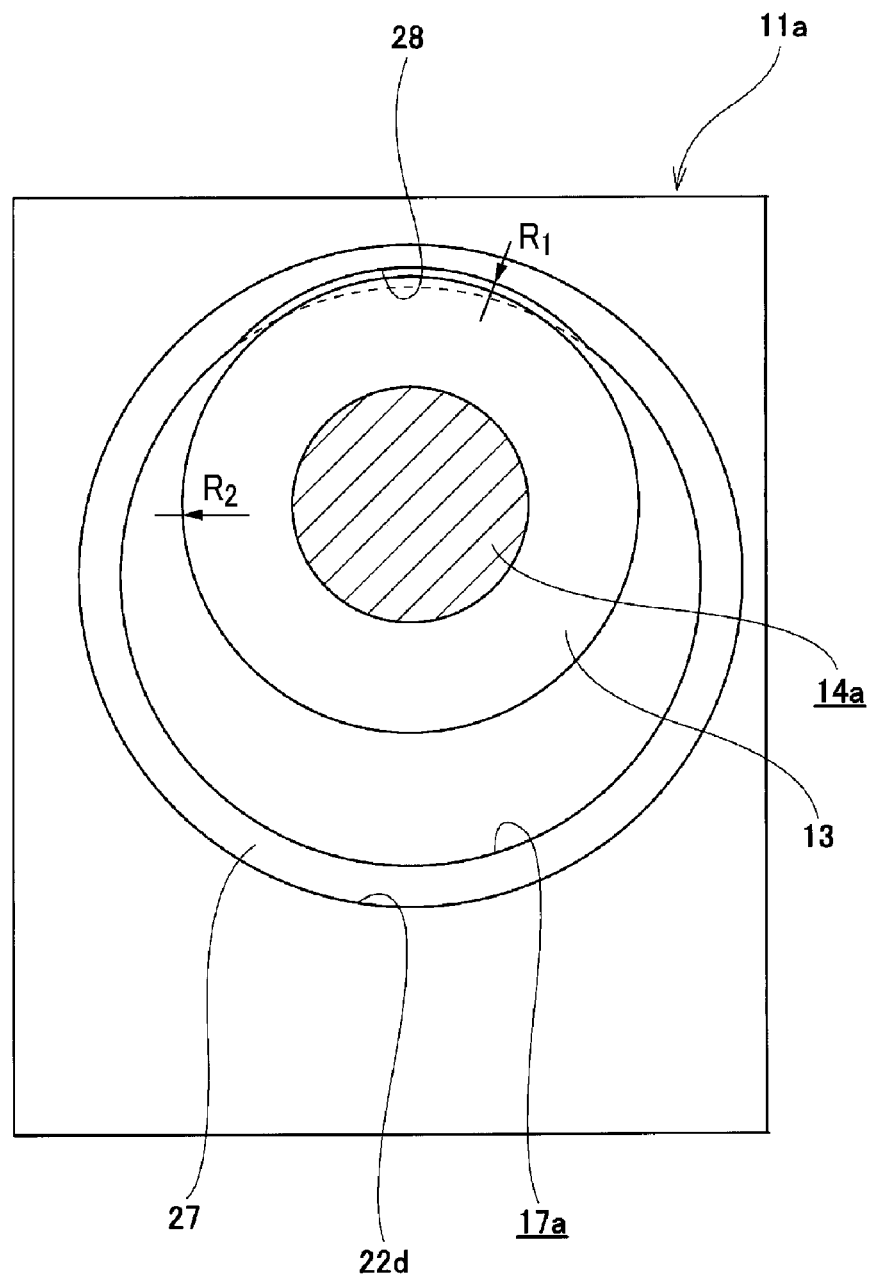
FIG. 3 is a sectional view taken along a line X-X of FIG. 2.
Figure 4:
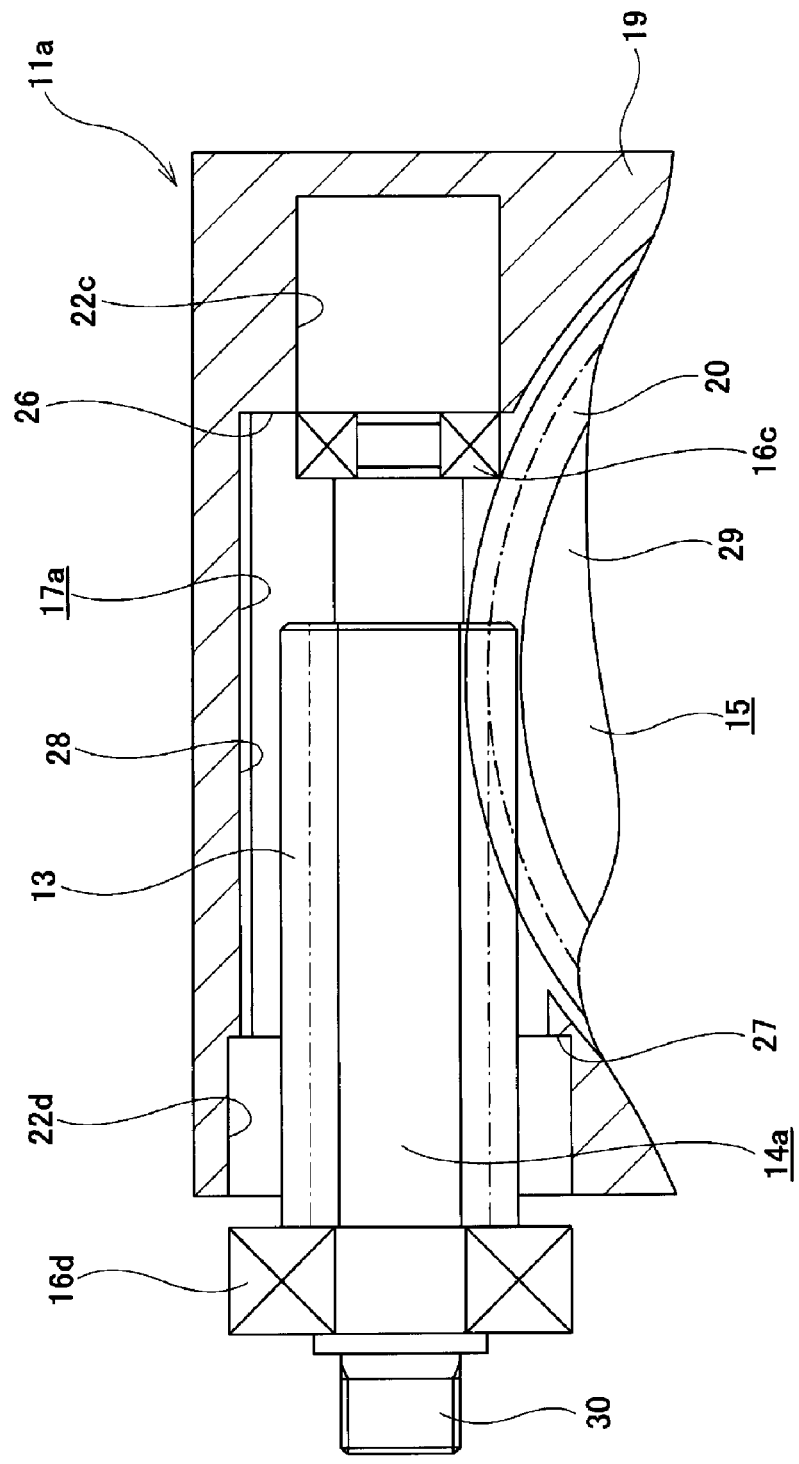
FIG. 4 is a sectional view showing a state where the worm is displaced inward in a radial direction of the worm wheel such that worm teeth and the worm wheel are meshed with each other according to the first embodiment of the present invention.

The worm reducer 21a is assembled as follows, for example. First, as shown in FIG. 1, the worm wheel 15 is rotatably supported to a predetermined position in the wheel accommodation part 19 of the housing 11a. The inner rings configuring the rolling bearings 16c, 16d are externally fitted and fixed (externally fitted by interference fit) to the tip portion and the base side portion of the worm 14a. Then, as shown in FIGS. 2 to 4, the worm 14a is inserted into the worm accommodation part 17a through the opening of the worm accommodation part 17a (the worm is axially displaced toward an inner end of the worm accommodation part 17a) at a state where the worm is offset outward (upward, in FIGS. 1 to 6) in the radial direction of the worm wheel 15 with respect to the center axis of the worm accommodation part 17a so that the worm teeth 13 do not interfere with the tooth part 20 of the worm wheel 15. Then, the tip-side rolling bearing 16c (provided at the leading side in the insertion direction of the worm 14a) supported and fixed to the tip portion of the worm 14a is caused to pass without interfering with the worm wheel 15 an outer diameter-side (upper side) of a part (uppermost portion) of an outer peripheral edge (tooth tip circle) of the worm wheel 15, which protrudes most into the worm accommodation part 17a, i.e., an outer diameter-side (upper side) of a center of the worm wheel 15 in the axial direction of the worm 14a.

To this end, according to the first embodiment, sizes of the respective members configuring the worm reducer 21 are defined as follows, as shown in FIG. 1. That is, an inner diameter of the opening side bearing holding part 22d is denoted as $d_{22d}$, an outer diameter of (the outer ring configuring) the tip-side rolling bearing 16c is denoted as $D_{16c}$, an outer diameter of the worm wheel 15 (a diameter of the tooth tip circle of the tooth part 20) is denoted as $D_{15}$, a diameter of the tooth tip circle of the worm teeth 13 is denoted as $D_k$, and a distance between the center axis of the worm wheel 15 and the center axis (which coincides with the center axis of the worm 14a after the assembling has completed) of the worm accommodation part 17a is denoted as L. The sizes of the respective members are defined such that the following Equation (1) is satisfied.

[Equation 1]

$$\frac{d_{22d}}{2} + L - \left(\frac{D_{15}}{2} + D_{16c}\right) \geq 0 \quad (1)$$

Accordingly, when the worm 14a is inserted into the worm accommodation part 17a through the opening of the worm accommodation part 17a at the state where the worm is offset with respect to the center axis of the worm accommodation part 17a, the tip-side rolling bearing 16c and the inner periphery of the opening side bearing holding part 22d are prevented from interfering with each other.

In the first embodiment, the inner periphery upper portion of the worm accommodation part 17a is formed with the relief concave portion 28 recessed radially outward. Thus, even when the worm 14a is inserted into the worm accommodation part 17a at the state where the worm is offset outward in the radial direction of the worm wheel 15 with respect to the center axis of the worm accommodation part 11a, the worm teeth 13 does not interfere with the inner periphery of the worm accommodation part 17a.

In the first embodiment, the outer diameter $D_{16c}$ of (the outer ring configuring) the tip-side rolling bearing 16c is made smaller than a distance G in the radial direction of the worm 14a between the uppermost portion of the outer peripheral edge of the worm wheel 15 and the inner periphery of the worm accommodation part 17a (the bottom of the relief concave portion 28) ($D_{16c}$<G). Accordingly, when the worm 14a is inserted into the worm accommodation part 17a through the opening of the worm accommodation part 17a at the state where the worm is offset with respect to the center axis of the worm accommodation pail 17a, the tip-side rolling bearing 16c and the inner periphery of the worm accommodation part 17a and worm wheel 15 are prevented from interfering with each other. In the first embodiment, the relief concave portion 28 has an arc shape having a radius $R_1$, as seen from an axial section. The radius $R_1$ and a radius $R_2$ of the worm 14a (the worm teeth 13) have a relation of $R_1 \geq R_2$.

By the above relation, it is possible to axially displace the worm 14a while appropriately escaping the worm 14a to the relief concave portion 28 so as not to interfere with the worm accommodation part 17a.

Meanwhile, in the first embodiment, the outer diameter $D_{16c}$ of the tip-side rolling bearing 16c is made greater than a tooth bottom circle diameter $D_f$ of the worm teeth 13 ($D_{16c} > D_f$). Therefore, strength and stiffness of the tip portion of the worm 14a are secured, and a radial load capacity of the tip-side rolling bearing 16c is secured. Incidentally, the outer diameter of the tip-side rolling bearing 16c may be made smaller than the tooth bottom circle diameter of the worm teeth as long as the strength and stiffness of the tip portion of the worm and the radial load capacity of the tip-side rolling bearing supported and fixed to the tip portion of the worm can be sufficiently secured. On the other hand, an outer diameter $D_{16d}$ of (the outer ring configuring) the base-side rolling bearing 16d supported and fixed to the base side portion of the worm 14a is made greater than the tooth tip circle diameter $D_k$ of the worm teeth 13 ($D_{16d} > D_k$).

Therefore, the bearing holding part 22c provided at the inner end portion of the worm accommodation part includes an inner periphery having a diameter which is smaller than the inner periphery of the worm accommodation part 17a. The bearing holding part 22c is formed close to the wheel accommodation part 19 than the inner periphery of the worm accommodation part 17a. Also, the bearing holding part 22d provided at the opening side of the worm accommodation part 17a includes an inner periphery having a diameter which is greater than the inner periphery of the worm accommodation part 17a; and is formed concentric with the bearing holding part 22c.

The tip-side rolling bearing 16c is caused to pass through the uppermost portion of the outer peripheral edge of the worm wheel 15 and the worm 14a is further inserted into the worm accommodation part 17a, so that a tip face (a right end face, in FIGS. 1, 2 and 4 to 6) of the tip-side rolling bearing 16c is contacted to a stepped portion 26 continued to the bearing holding part 22c provided at the inner end portion of the worm accommodation part 17a and the inner periphery of the intermediate portion of the worm accommodation part 17a. At this state, the worm 14a is displaced inward (downward, in FIGS. 1 to 6) in the radial direction of the worm wheel 15 so that the center axis of the worm 14a and the center axis of the worm accommodation part 17a are concentric with each other, thereby meshing the worm teeth 13 and the tooth part 20 of the worm wheel 15 each other, as shown in FIG. 4. Specifically, when the tip face of the tip-side rolling bearing 16c is contacted to the stepped portion 26 continued to the inner periphery of the intermediate portion of the worm accommodation part 17a (when the worm 14a is displaced inward in the radial direction of the worm wheel 15), the worm teeth 13 are meshed with the tooth part 20 provided at the center of the worm wheel 15. At this state, the outer ring of the tip-side rolling bearing 16c and the bearing holding part 22c are arranged concentric with each other. In the first embodiment, the bearing holding pail 22c has a bottomed cylindrical shape having a closed inner end side (a right side, in FIGS. 1, 2 and 4 to 6).

In the meantime, the bearing holding part 22c is not limited to the always-closed bottomed cylindrical shape. For example, the bearing holding part may have a bottomed cylindrical shape where a bottom 22c1 is configured by a separate member such as a cover, and the bottom 22c1 may be opened upon maintenance, for example.

Figure 5:
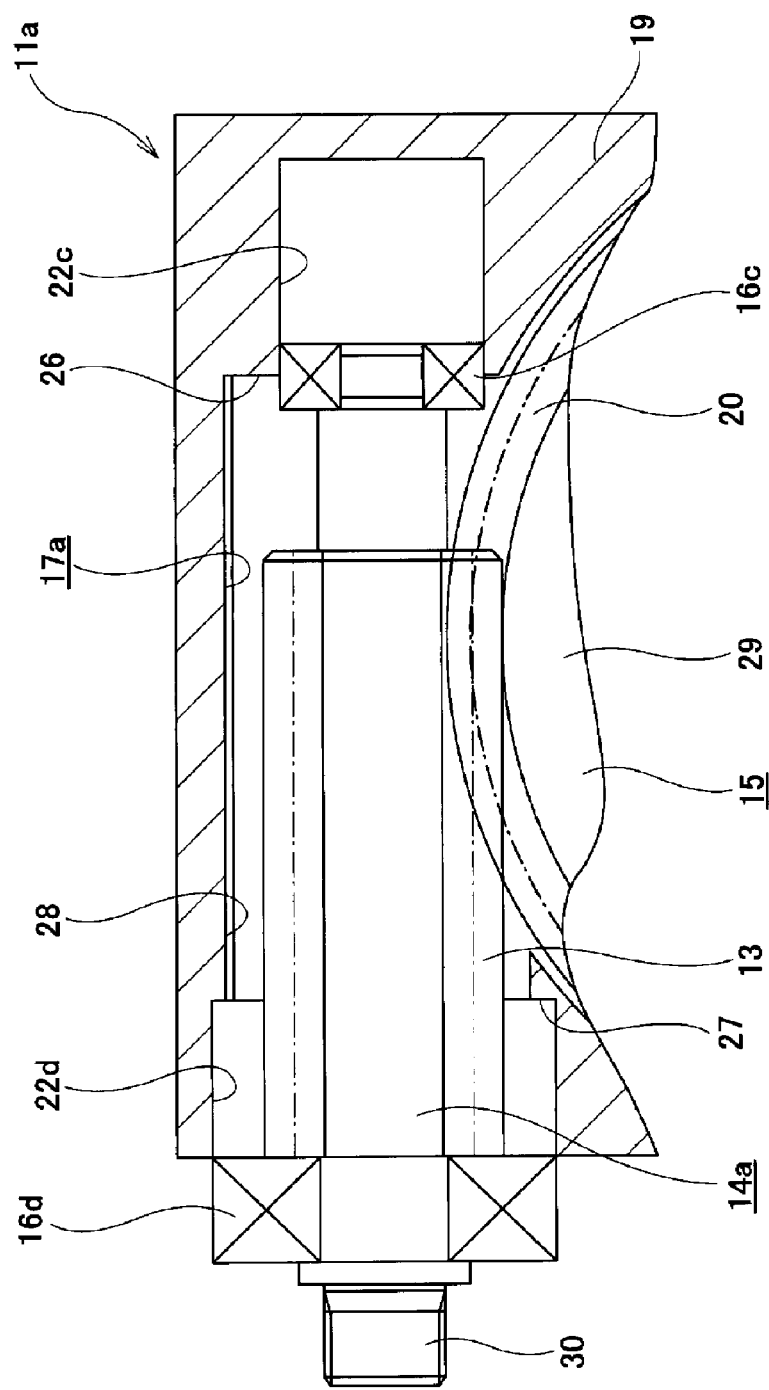
FIG. 5 is a sectional view showing a state where the worm is further inserted into the worm accommodation part of the housing according to the first embodiment of the present invention.
Figure 6:
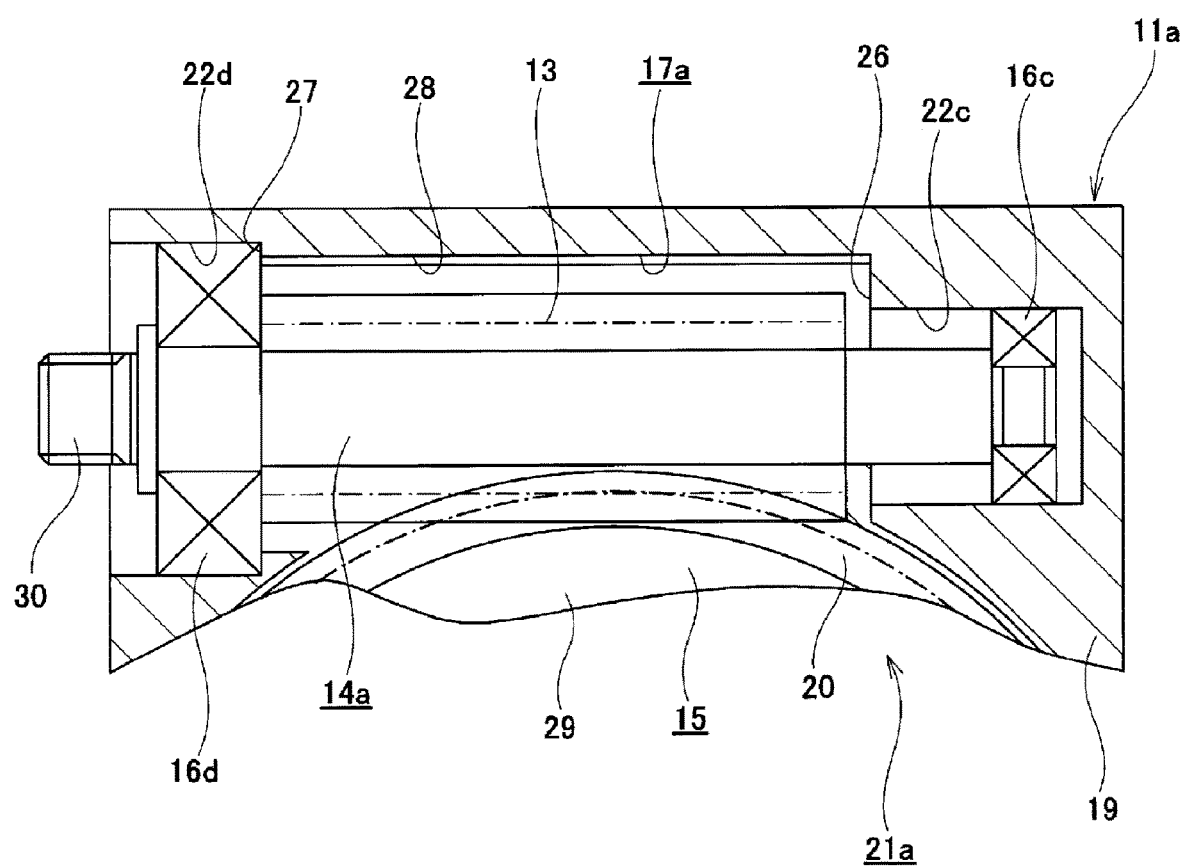
FIG. 6 is a sectional view showing a state where the worm is mounted to the worm accommodation part of the housing according to the first embodiment of the present invention.
Figure 7:
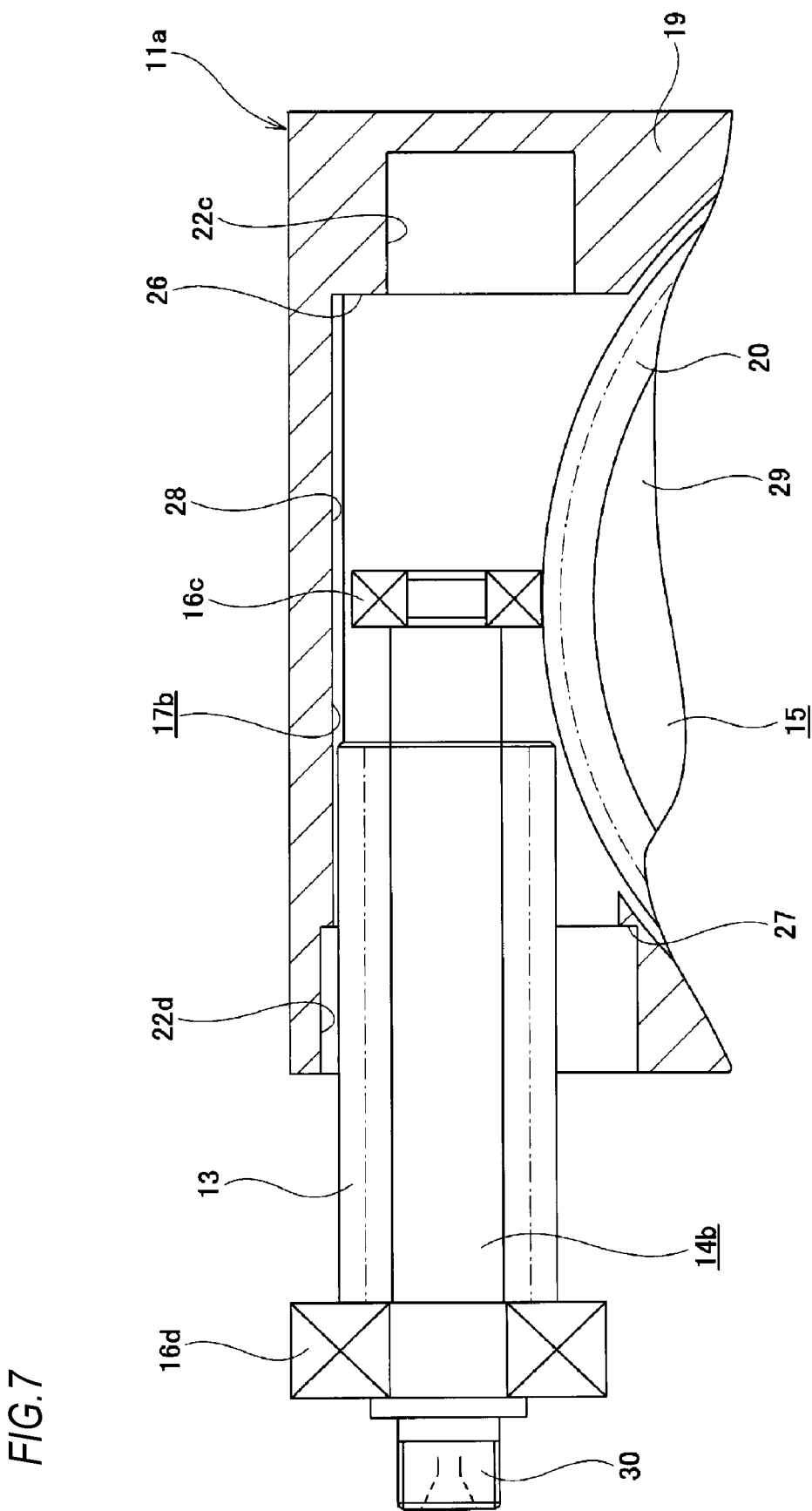
FIG. 7 is a view similar to FIG. 2, showing a second embodiment of the present invention.

From the above state, the worm wheel 15 is rotated to further insert the worm 14a into the worm accommodation part 17a, so that the outer ring of the tip-side rolling bearing 16c is directly press-fitted (internally fitted by interference fit) into the bearing holding part 22c or is internally fitted thereto by loose fit and the outer ring of the base-side rolling bearing 16d is directly press-fitted (internally fitted by interference fit) into the bearing holding part 22d provided at the opening of the worm accommodation part 17a or is internally fitted thereto by loose fit, as shown in FIGS. 5 and 6. In the first embodiment, the inner peripheries of the bearing holding parts 22c, 22d are slightly inclined in a direction along which the inner diameters decrease right up to the fitting positions of the outer rings, from the opening side (the left side in FIGS. 1, 2 and 4 to 6) toward the inner end side (the right side in FIGS. 1, 2 and 4 to 6) (toward the leading side in the insertion direction of the worm 14a). Therefore, the worm 14a is positioned in the radial direction as the outer rings of the pair of rolling bearings 16c, 16d are respectively press-fitted into the pair of bearing holding parts 22c, 22d, and the meshed state between the worm teeth 13 and the tooth part 20 becomes appropriate (there is no backlash at the meshed portion). In the first embodiment, as the worm 14a is inserted into the worm accommodation part 17a, the outer ring of the tip-side rolling bearing 16c supported and fixed to the tip portion of the worm 14a is press-fitted (internally fitted) into the bearing holding part 22c provided at the inner end portion of the worm accommodation part 17a. The sizes of the respective parts are regulated so that at a stage where the outer ring of the tip-side rolling bearing 16c is press-fitted into the bearing holding part 22c to some extent (by about a half), the outer ring of the base-side rolling bearing 16d supported and fixed to the base side portion of the worm 14a is press-fitted into the bearing holding part 22d provided at the opening of the worm accommodation part 17a. That is, in the first embodiment, the tip-side rolling bearing 16c corresponds to one of the rolling bearings, and the base-side rolling bearing 16d corresponds to the other of the rolling bearings in Claims.

The worm 14a is positioned in the axial direction by bringing the tip face of the base-side rolling bearing 16d into contact with a stepped portion 27 continued to the bearing holding part 22d and the intermediate portion of the worm accommodation part 17a. Then, a portion (a portion adjacent to an opposite side to the stepped portion 27) axially adjacent to the portion (the bearing holding part 22d) of the opening of the worm accommodation part 17a, to which the base-side rolling bearing 16d is internally fitted, is engaged with a snap ring, so that the axial displacements of the base-side rolling bearing 16d and the worm 14a are restricted. Meanwhile, in addition to the snap ring or instead of the snap ring, the outer ring of the base-side rolling bearing 16d may be urged toward the tip-side of the worm 14a by a screw (nut) or a member such as a plate-shaped member (a plate spring) fixed by a screw, for example. Then, a spline shaft portion 30 provided at the base end portion of the worm 14a is spline-engaged with the output shaft 18 of the electric motor 10a, and the opening of the worm accommodation part 17a is closed by a motor case 25 having the electric motor 10a accommodated therein.

According to the assembling method of the worm reducer of the first embodiment, since it is possible to integrally mount the worm 14a and the pair of rolling bearings 16c, 16d for rotatably supporting the worm 14a in the worm accommodation part 17a of the housing 11a, it is possible to suppress the assembling cost and to save the manufacturing cost of the worm reducer 21a.

Further, in the first embodiment, the worm 14a is inserted into the worm accommodation part 17a at the state where the worm is offset outward in the radial direction of the worm wheel 15 with respect to the center axis of the worm accommodation part 17a, the tip-side rolling bearing 16c externally fitted to the tip portion of the worm 14a is caused to pass through the outer diameter-side of the most protruding portion of the worm wheel 15 into the worm accommodation part 17a without interfering with each other, and then the worm teeth 13 and the tooth part 20 of the worm wheel 15 are meshed with each other. Therefore, when mounting the worm 14a into the worm accommodation part 17a, it is possible to suppress the axial displacement amount of the worm 14a at the state where the worm teeth 13 and the tooth part 20 are meshed with each other, as compared to a configuration where the worm teeth and the tooth part of the worm wheel are meshed with each other from start of the mounting operation without offsetting the worm (there is no space for offsetting the worm). Therefore, even when the backlash is not provided between the worm teeth 13 and the tooth part 20, in the worm reducer 21a of the first embodiment, the worm teeth 13 and the tooth part 20 are less likely to be damaged such as scratches upon the assembling of the worm reducer 21a. In particular, in the worm reducer 21a, the tooth part 20 of the worm wheel 15 is made of the synthetic resin. Therefore, it is possible to achieve the damage preventing effect upon the assembling.

Further, in the first embodiment, at the final stage of the mounting operation of mounting the worm 14a into the worm accommodation part 17a, the outer ring of the tip-side rolling bearing 16c supported and fixed to the tip portion of the worm 14a is press-fitted into the bearing holding part 22c provided at the inner end portion of the worm accommodation part 17a, and after the corresponding press-fitting is made to some extent, the outer ring of the other rolling bearing 16d supported and fixed to the base side portion of the worm 14a is press-fitted into the bearing holding part 22d provided at the opening of the worm accommodation part 17a. That is, since the operation of press-fitting the outer ring of the base-side rolling bearing 16d into the bearing holding part 22d can be performed at the state where the positioning is made to some extent in the radial direction, it is possible to easily carry out the press-fitting operation even in a structure where the backlash is not provided between the worm teeth 13 and the tooth part 20.

[Second Embodiment]

FIGS. 7 to 10 show a second embodiment of the present invention. In the first embodiment, a length between the pair of rolling bearings 16c, 16d fixed to the worm 14a is longer than a length from the stepped portion 26 of a worm accommodation part 17b to the opening end of the other bearing holding part 22d. However, in the second embodiment, the length between the pair of rolling bearings 16c, 16d fixed to the worm 14a is shorter than the length from the stepped portion 26 of the worm accommodation part 17h to the opening end of the other bearing holding part 22d.

Figure 8:
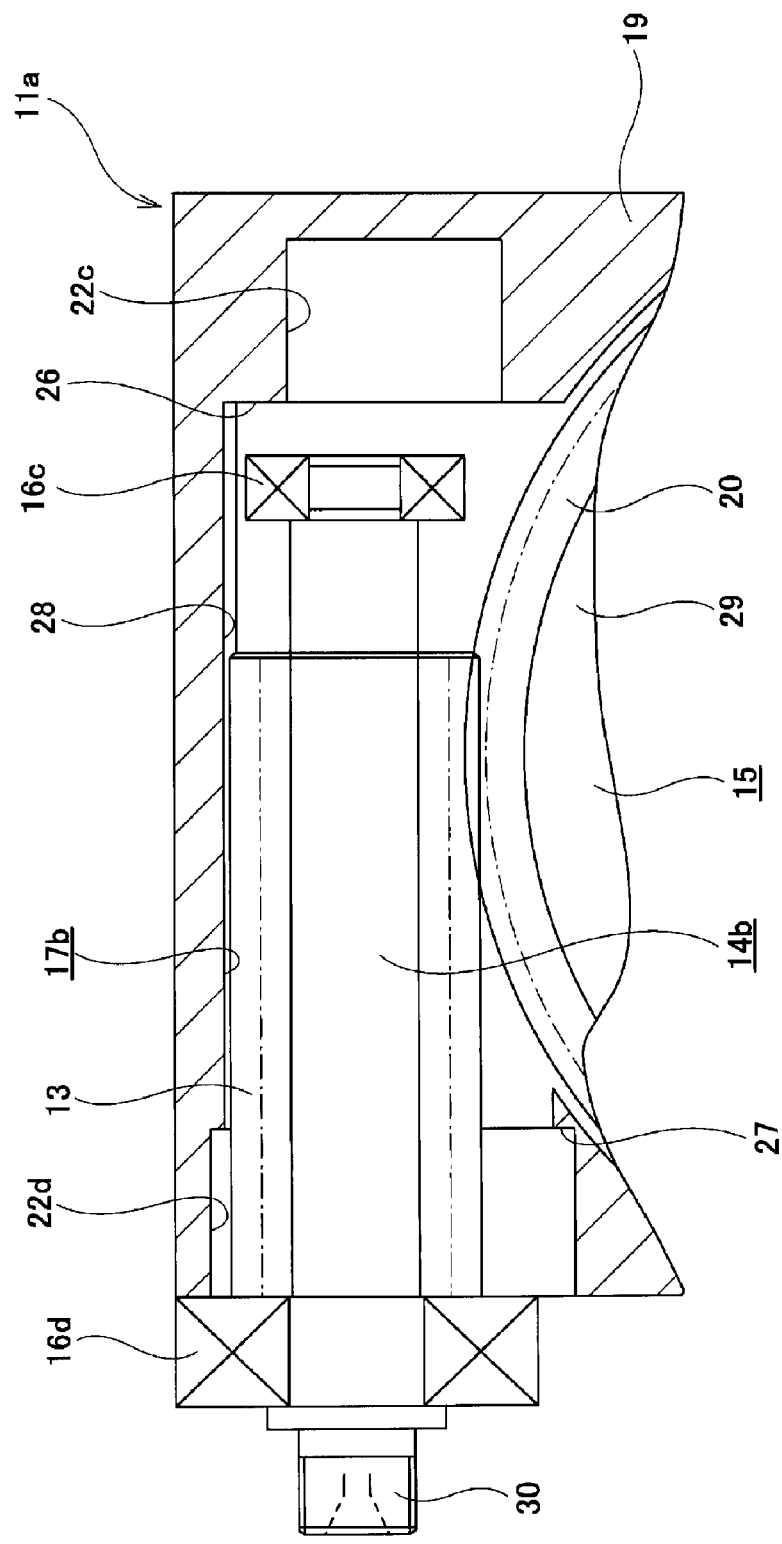
FIG. 8 is a view showing a state where the worm is further inserted into the worm accommodation part from the state of FIG. 7 and a side surface of a rolling bearing provided at the trailing side in the insertion direction of the worm is in contact with an end face of the worm accommodation part according to the second embodiment of the present invention.
Figure 9:
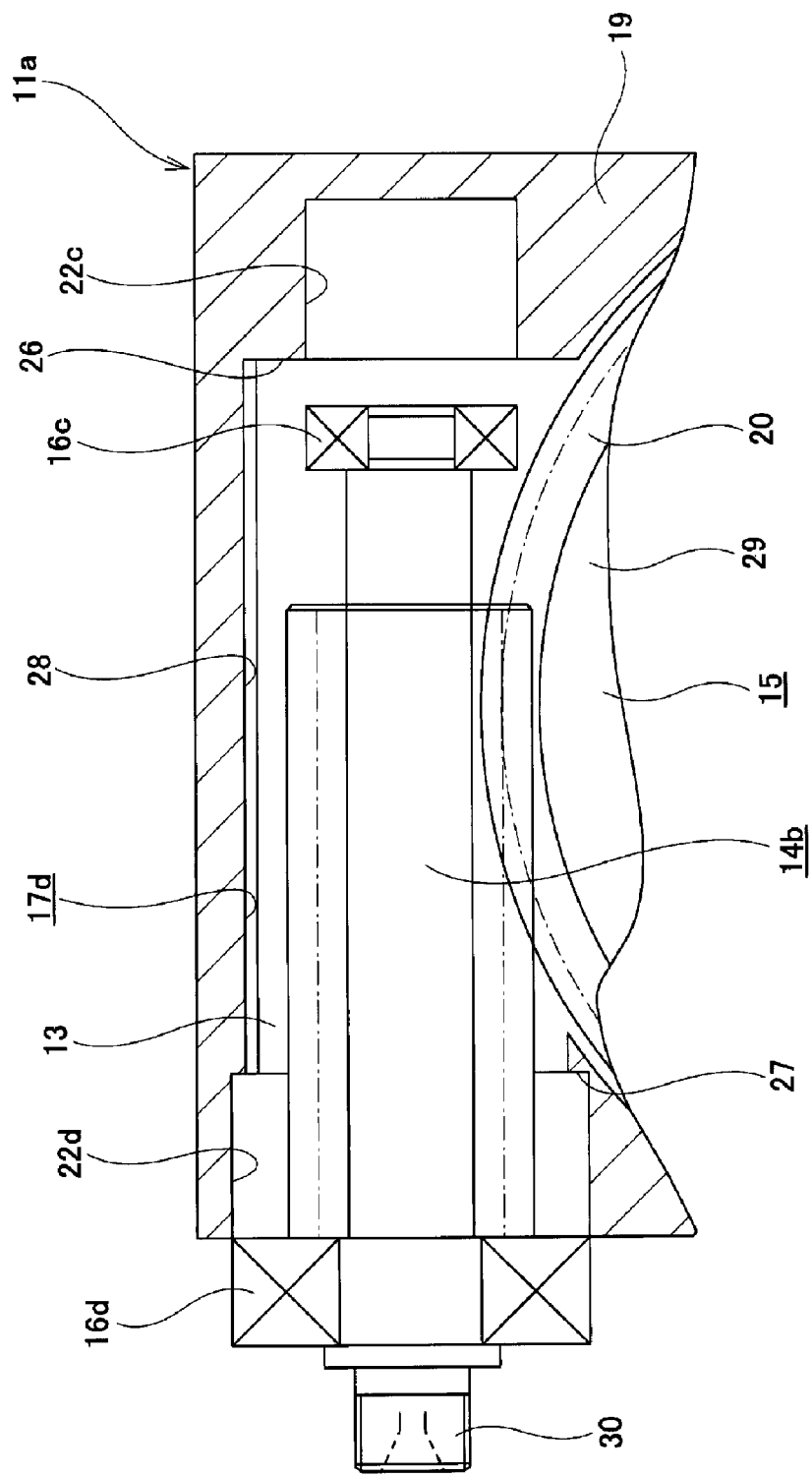
FIG. 9 is a view showing a state where the worm is displaced inward in the radial direction of the worm wheel from the state of FIG. 8 according to the second embodiment of the present invention.
Figure 10:
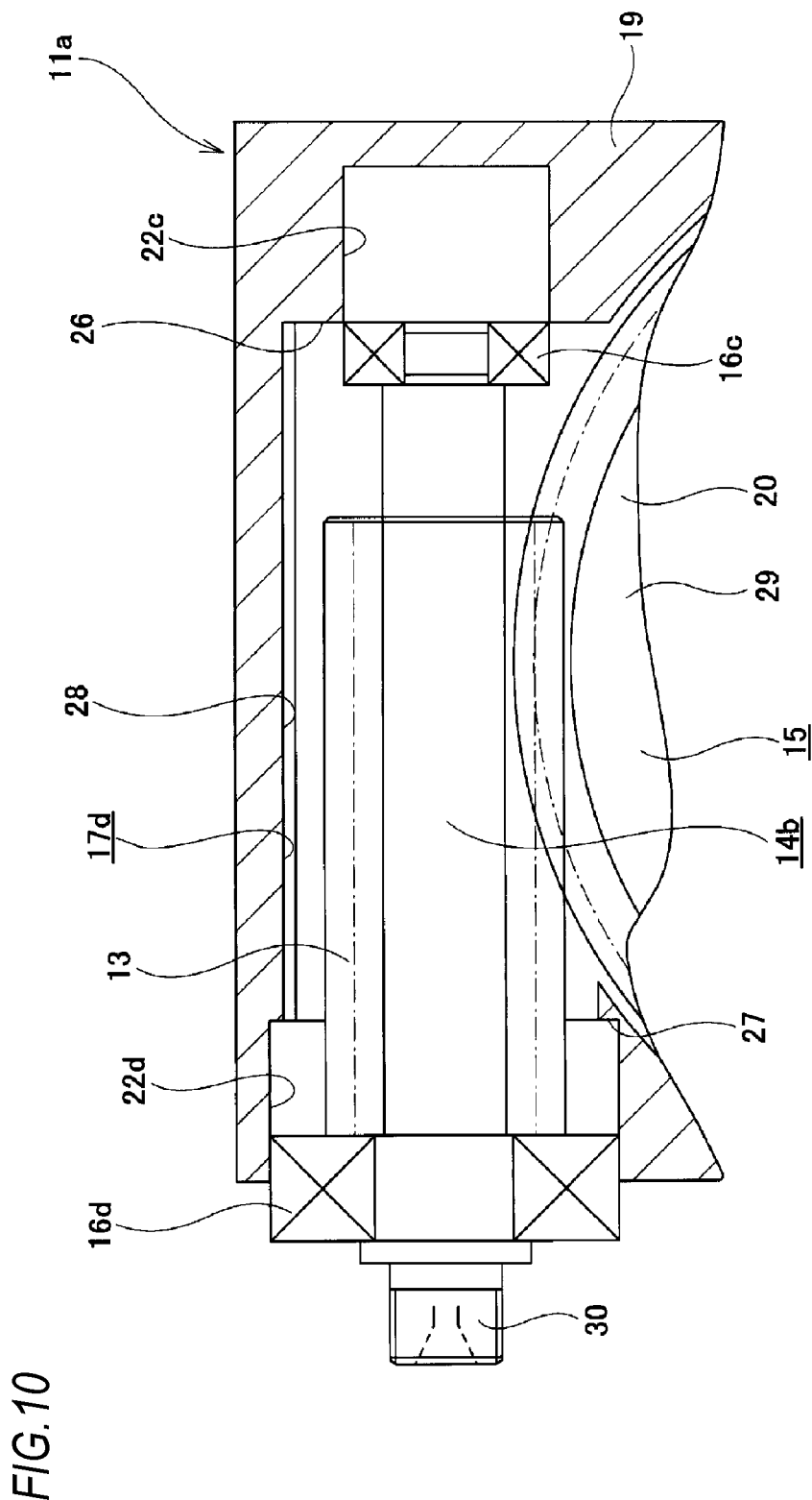
FIG. 10 is a view showing a state where the worm is further inserted into the worm accommodation part from the state of FIG. 9 according to the second embodiment of the present invention.

According to the assembling method of the worm reducer of the second embodiment, similarly to the first embodiment, the worm 14b is inserted into the worm accommodation part 17b through the opening of the worm accommodation part 17b at the state where the worm is offset outward in the radial direction of the worm wheel 15 with respect to the center axis of the worm accommodation part 17b. Then, the tip-side rolling bearing 16c externally fitted to the tip portion (the right end portion, in FIGS. 7 to 10) of the worm 14b is caused to pass through the uppermost portion of the outer peripheral edge of the worm wheel 15, the worm 14b is further inserted into the worm accommodation part 17b, and as shown in FIG. 8, a tip side surface (a side surface of the leading side in the insertion direction of the worm 14b; a right side surface in FIGS. 7 to 10) of the base-side rolling bearing 16d externally fitted to the base side portion of the worm 14b is contacted to an opening side end face (a left end face in FIGS. 7 to 10) of the worm accommodation part 17b. At this state, the worm 14h is displaced inward in the radial direction of the worm wheel 15 so that the center axis of the worm 14h is concentric with the center axis of the worm accommodation part 17b, thereby meshing the worm teeth 13 provided on the axially intermediate portion of the worm 14b and the tooth part 20 of the worm wheel 15 each other, as shown in FIG. 9. Then, the worm wheel 15 is rotated to further insert the worm 14b into the worm accommodation part 17b. Thereby, the outer ring of the base-side rolling bearing 16d is internally fitted to the bearing holding part 22d provided at the opening of the worm accommodation part 17b. However, while rotating the worm 14b with the rotation of the worm wheel 15 being restrained, the worm 14b may be inserted into the worm accommodation part 17b. In any configuration, at a stage where the outer ring of the base-side rolling bearing 16d is internally fitted to the bearing holding part 22d to some extent (by about a half), the outer ring of one rolling bearing 16c supported and fixed to the tip portion of the worm 14a is internally fitted to the bearing holding part 22c provided at the inner end portion of the worm accommodation part 17a. That is, in the second embodiment, the base-side rolling hearing 16d corresponds to one of the rolling bearings, and the tip-side rolling bearing 16c corresponds to the other of the rolling bearings in Claims.

The configurations and operations of the other parts are the same as the first embodiment.

In the meantime, the present invention is not limited to the above embodiments and can be appropriately changed and improved.

Figure 11:
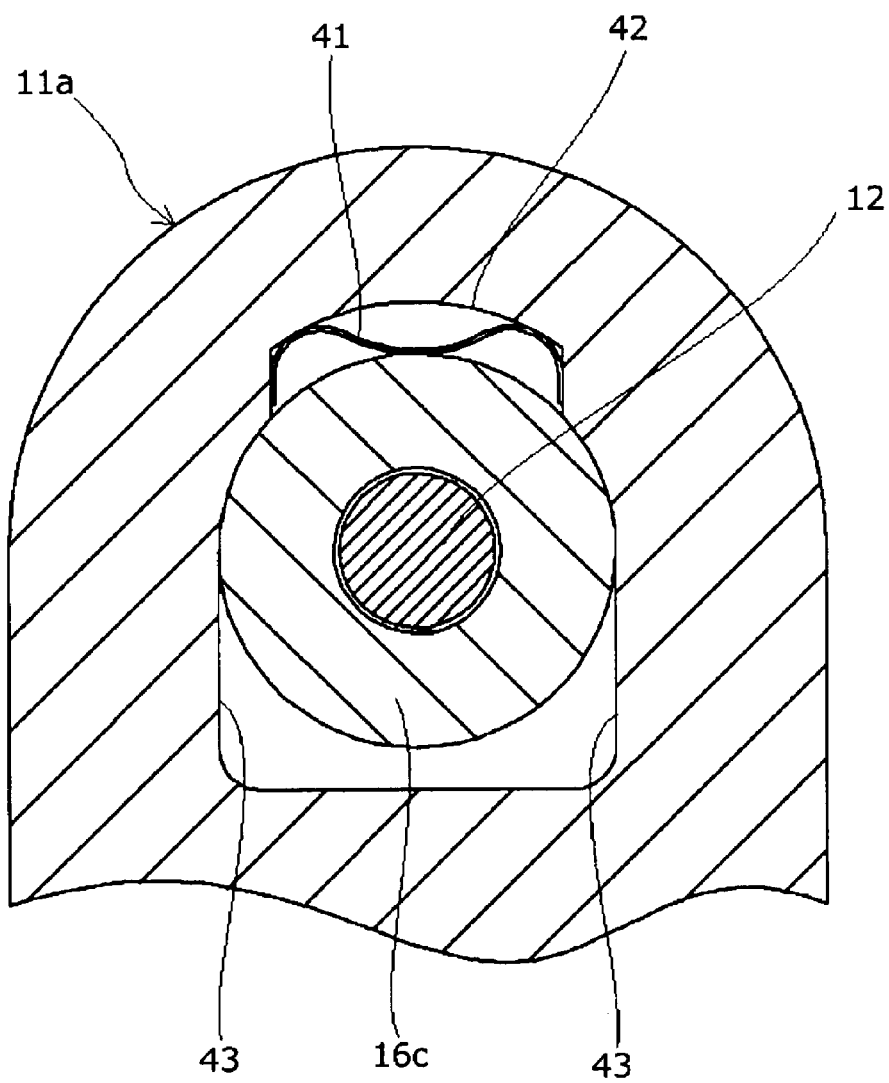
FIG. 11 is a view showing a preload mechanism configured to press the worm toward the worm wheel with the worm being mounted to the worm accommodation part of the housing.

For example, a preload mechanism shown in FIG. 11 may be further provided so as to press the worm toward the worm wheel at the state where the worm is mounted to the worm accommodation part by the assembling method of the worm reducer in accordance with the embodiments of the present invention. In FIG. 11, the housing 11a is formed with a plate spring accommodation part 42 above the outer peripheral portion of the rolling bearing 16c. A part of the housing 11a, which corresponds to the lower half part of the outer peripheral portion of the rolling bearing 16c, is provided with planar surface parts 43 parallel with each other and configured to slidably guide an outer diameter portion in a horizontal direction of the rolling bearing 16c. In the plate spring accommodation part 42, a plate spring 41 having a waveform shape is accommodated. By the plate spring 41, an urging force for moving downward the rolling bearing 16c in FIG. 11 is generated. By the urging force, the worm 14a of which one shaft end is inserted into the inner ring of the rolling bearing 16c is urged toward the worm wheel 15.

Figure 12:
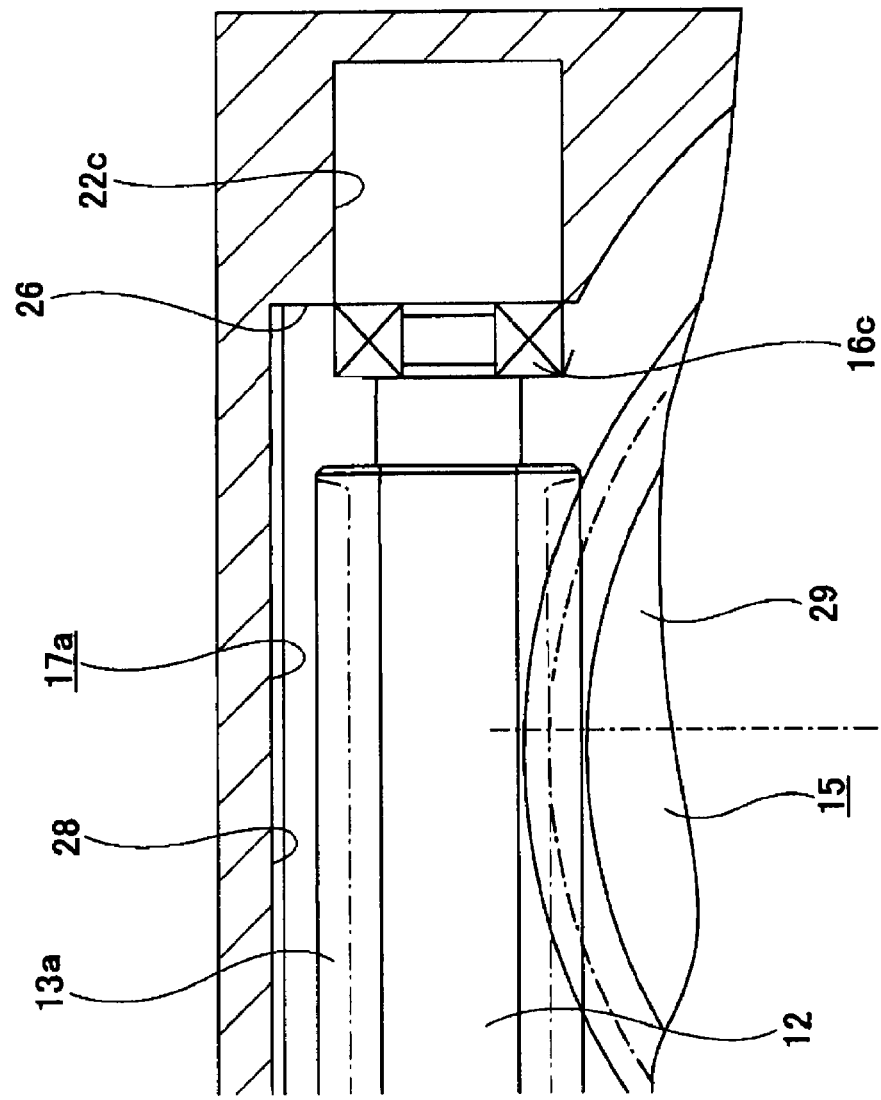
FIG. 12 is a sectional view showing a state where the worm having worm teeth which are not provided up to an end portion is displaced inward in the radial direction of the worm wheel and the worm teeth and the worm wheel are meshed with each other.

In the above-described embodiments, the worm teeth 13 are formed up to the end portion. However, as shown in FIG. 12, even though the worm teeth 13a are not formed up to the end portion, when displacing the worm 14a inward in the radial direction of the worm wheel 15, the worm teeth 13a is meshed with the tooth part 20 positioned at the center of the worm wheel 15.

Figure 13:
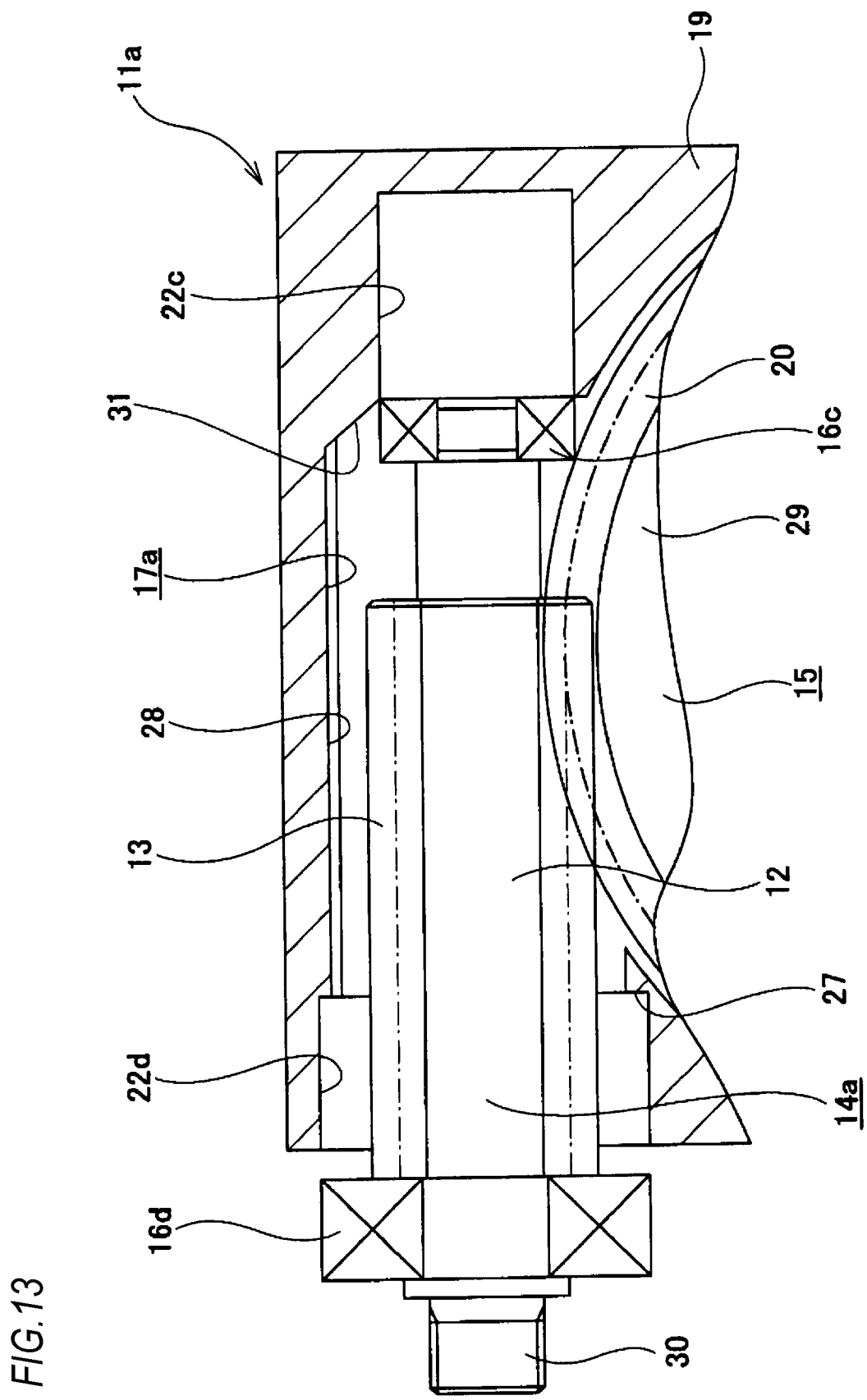
FIG. 13 is a sectional view showing a modified embodiment of the present invention where the housing is provided with a guide portion.
Figure 14:
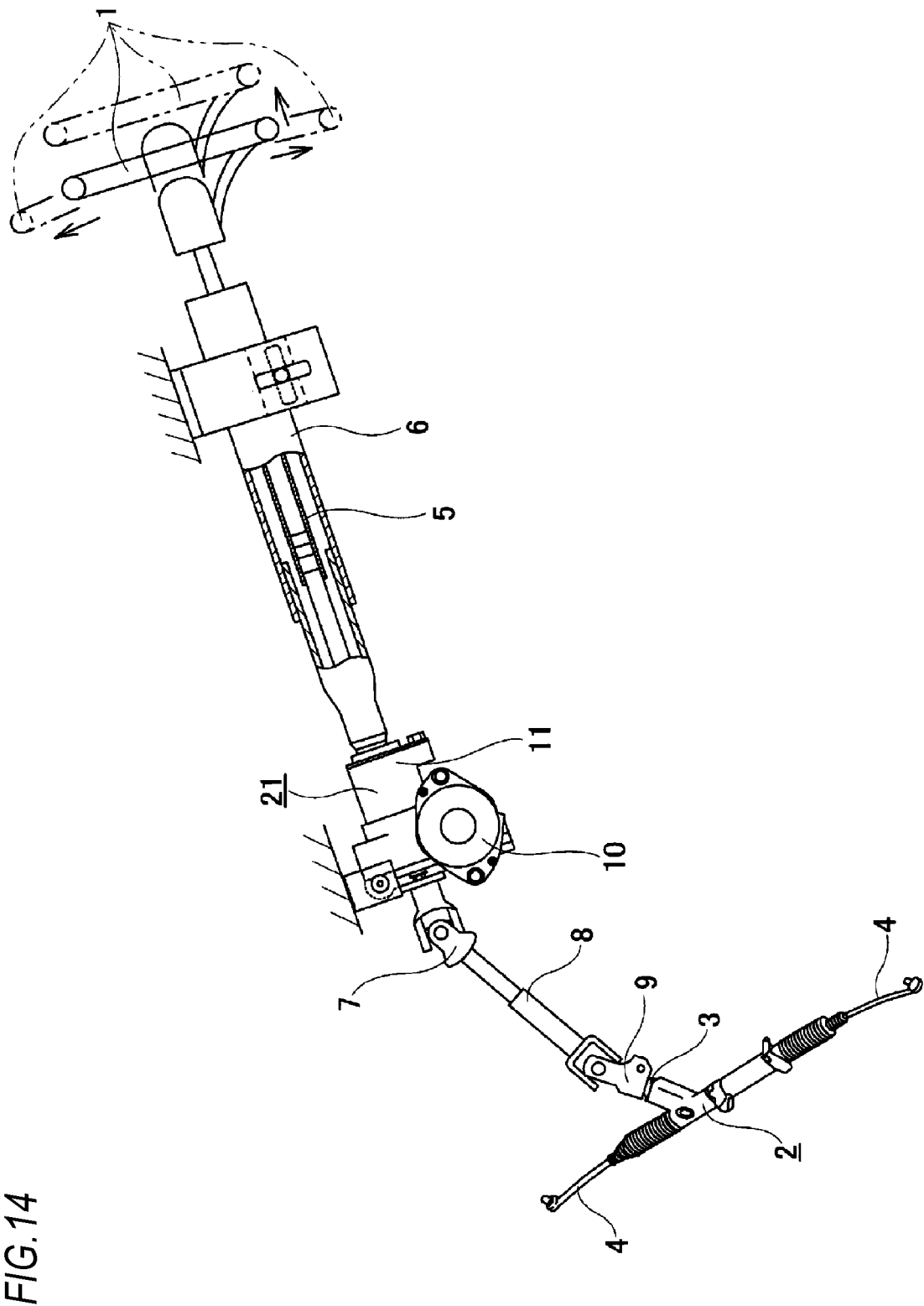
FIG. 14 is a partially cut side view showing an example of a conventional steering device for an automobile.

Further, as shown in FIG. 13, instead of the stepped portion 26, a guide portion 31 configured to guide the rolling bearing 16c so that the rolling bearing 16c and the bearing holding part 22c are arranged concentric with each other may be provided. In this case, the worm 14a is displaced inward in the radial direction while the rolling bearing 16c contacting the guide portion 31, so that the rolling bearing 16c and the bearing holding part 22c are arranged concentric with each other. That is, the guide portion 31 can concentrically arrange the rolling bearing 16c and the bearing holding part 22c by displacing the worm 14a inward in the radial direction based on the force of axially displacing the worm 14a. In this embodiment, the guide portion 31 has a conical surface facing toward the bearing holding part 22c. However, the shape of the guide portion is not limited thereto as long as a diameter decreases from the inner periphery of the worm accommodation part 17a toward the bearing holding part 22c.

In the above-described embodiments, the outer diameter $D_{16c}$ of the tip-side rolling bearing 16c is made smaller than the tooth tip circle diameter $D_k$ of the worm teeth 13 ($D_{16c}<D_k$) but may be made greater than the tooth tip circle diameter $D_k$ of the worm teeth 13 ($D_{16c}>D_k$). In this case, the radius $R_1$ of the relief concave portion 28 may be $R_1 \geq D_{16c}/2$.

The present application is based on a Japanese Patent Application No. 2014-207998 filed on Oct. 9, 2014, a Japanese Patent Application No. 2015-035315 filed on Feb. 25, 2015, an International Patent Application No. PCT/JP2015/062585 filed on Apr. 24, 2015, and a Japanese Patent Application No. 2015-171648 filed on Sep. 1, 2015, which are herein incorporated by reference.

DESCRIPTION OF REFERENCE NUMERALS

1: steering wheel
2: steering gear unit
3: input shaft
4: tie rod
5, 5a: steering shaft
6: steering column
7: universal joint
8: intermediate shaft
9: universal joint
10, 10a: electric motor
11, 11a: housing
12: worm shaft
13, 13a: worm teeth
14, 14a, 14b: worm
15: worm wheel
16a to 16c: rolling bearing
17, 17a, 17b: worm accommodation part
18: output shaft
19: wheel accommodation part
20: tooth part
21, 21a: worm reducer
22a to 22d: bearing holding part
23: engagement groove
24: snap ring
25: motor case
26: stepped portion
27: stepped portion
28: relief concave portion
29: wheel part
30: spline shaft portion
31: guide portion
41: plate spring
42: plate spring accommodation part
43: planar surface part

The invention claimed is:

1. A method of assembling a worm reducer which includes:
   a housing including a wheel accommodation part, and a worm accommodation part provided in a skew position with respect to the wheel accommodation part and having a part continued to the wheel accommodation part;
   a worm wheel rotatably supported in the wheel accommodation part; and
   a worm including worm teeth provided on an axially intermediate portion of a worm shaft and rotatably supported in the worm accommodation part at two axial positions which interpose the worm teeth therebetween by a pair of bearings at a state where the worm teeth are meshed with the worm wheel,
   the method comprising:
   causing the worm wheel to be rotatably supported in the wheel accommodation part;
   externally fitting the pair of bearings at the two axial positions which interpose the worm teeth therebetween;
   inserting the worm into the worm accommodation part from an opening side of the worm accommodation part at a state where the worm is offset outward in a radial direction of the worm wheel such that the worm teeth and the worm wheel do not interfere with each other;
   causing one of the pair of bearings which is externally fitted to a leading side in an insertion direction of the worm to pass an outer diameter-side of a part of an outer peripheral edge of the worm wheel, which protrudes most into the worm accommodation part;
   displacing the worm inward in the radial direction of the worm wheel such that the worm teeth mesh with the worm wheel; and
   further inserting the worm to a predetermined position in the worm accommodation part while the worm teeth and the worm wheel are meshed with each other, so that the worm is rotatably supported in the worm accommodation part by the pair of bearings,
   wherein an outer diameter of the one of the pair of bearings which is externally fitted to the leading side in the insertion direction of the worm is made smaller than a tooth tip circle diameter of the worm teeth.

2. The method of assembling a worm reducer according to claim 1,
   wherein each of the pair of bearings is a rolling bearing which includes a plurality of rolling elements provided between an outer ring and an inner ring, and a pair of bearing holding parts for holding the outer rings of the pair of rolling bearings are provided on an inner periphery of the worm accommodation part at two positions in a worm axial direction, and
   wherein after the outer ring of one of the pair of rolling bearings starts to internally fit to one of the pair of bearing holding parts, the outer ring of the other of the pair of rolling bearings is internally fit to the other of the pair of bearing holding parts.

3. The method of assembling a worm reducer according to claim 1,
   wherein no backlash is provided between the worm teeth and the worm wheel.

4. The method of assembling a worm reducer according to claim 2,
   wherein the one of the bearing holding parts, which is provided at an inner end portion of the worm accommodation part, includes an inner periphery having a diameter which is smaller than the inner periphery of the worm accommodation part, wherein the worm accommodation part includes a guide portion having a diameter decreasing from the inner periphery of the worm accommodation part toward the one of the bearing holding parts, and wherein the worm is displaced inward in the radial direction of the worm wheel while the one of the bearings which is externally fitted to the leading side in the insertion direction of the worm contacting the guide portion such that the worm teeth mesh with the worm wheel.

* * * * *